United States Patent [19]

Noguchi

[11] Patent Number: 5,040,875
[45] Date of Patent: Aug. 20, 1991

[54] ACTIVE MATRIX LIQUID CRYSTAL DISPLAY HAVING A HIGH CONTRAST RATIO

[75] Inventor: Kesao Noguchi, Tokyo, Japan

[73] Assignee: NEC Corporation, Tokyo, Japan

[21] Appl. No.: 222,979

[22] Filed: Jul. 22, 1988

[30] Foreign Application Priority Data

Jul. 22, 1987 [JP] Japan .................. 62-183916

[51] Int. Cl.$^5$ ............................. G02F 1/133
[52] U.S. Cl. .................... 359/59; 357/23.7; 359/68
[58] Field of Search ............ 350/333, 334, 336, 339 F; 340/784; 357/23.7, 45

[56] References Cited

U.S. PATENT DOCUMENTS

| | | | |
|---|---|---|---|
| 4,617,646 | 10/1986 | Yang | 350/333 |
| 4,632,514 | 12/1986 | Ogawa et al. | 350/339 F |
| 4,647,156 | 3/1987 | Fujimura et al. | 350/339 R |
| 4,653,859 | 3/1987 | Masaki | 350/336 |
| 4,653,862 | 3/1987 | Morozumi | 350/339 F |
| 4,687,298 | 8/1987 | Aoki et al. | 350/334 |
| 4,717,244 | 1/1988 | Hilsum et al. | 350/333 |
| 4,772,099 | 9/1988 | Kato et al. | 350/334 |
| 4,776,673 | 10/1988 | Aoki et al. | 350/334 |
| 4,834,506 | 5/1989 | Demke et al. | 350/334 |
| 4,834,507 | 5/1989 | Kato et al. | 350/334 |
| 4,838,657 | 6/1989 | Miura et al. | 350/336 |

Primary Examiner—Stanley D. Miller
Assistant Examiner—Tai Van Duong
Attorney, Agent, or Firm—Sughrue, Mion, Zinn, Macpeak & Seas

[57] ABSTRACT

An active matrix liquid crystal display includes a number of scan lines, a number of signal lines intersecting the scan lines to cooperate with the scan lines so as to form a matrix. A number of driving thin film transistors are arranged in the form of a matrix and positioned one for each of intersecting points between the scan lines and the signal lines. Each of the driving thin film transistors is connected to one scan line and one signal line. A number of liquid crystal display elements are connected one to each of the driving thin film transistors so that the liquid crystal display elements are selectively driven by the associated thin film transistors. Each of the liquid crystal display elements has a display electrode, a counter electrode opposing the display electrode and a liquid crystal between the display electrode and the counter electrode. The counter electrode has a slit at a region which is opposite to the signal line but which excludes an area where the signal lines and the scan lines are intersected.

2 Claims, 9 Drawing Sheets

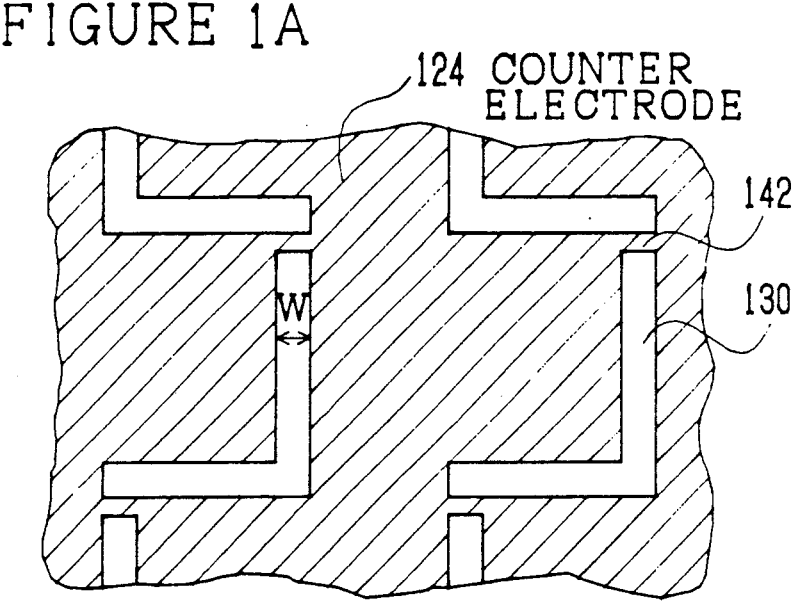
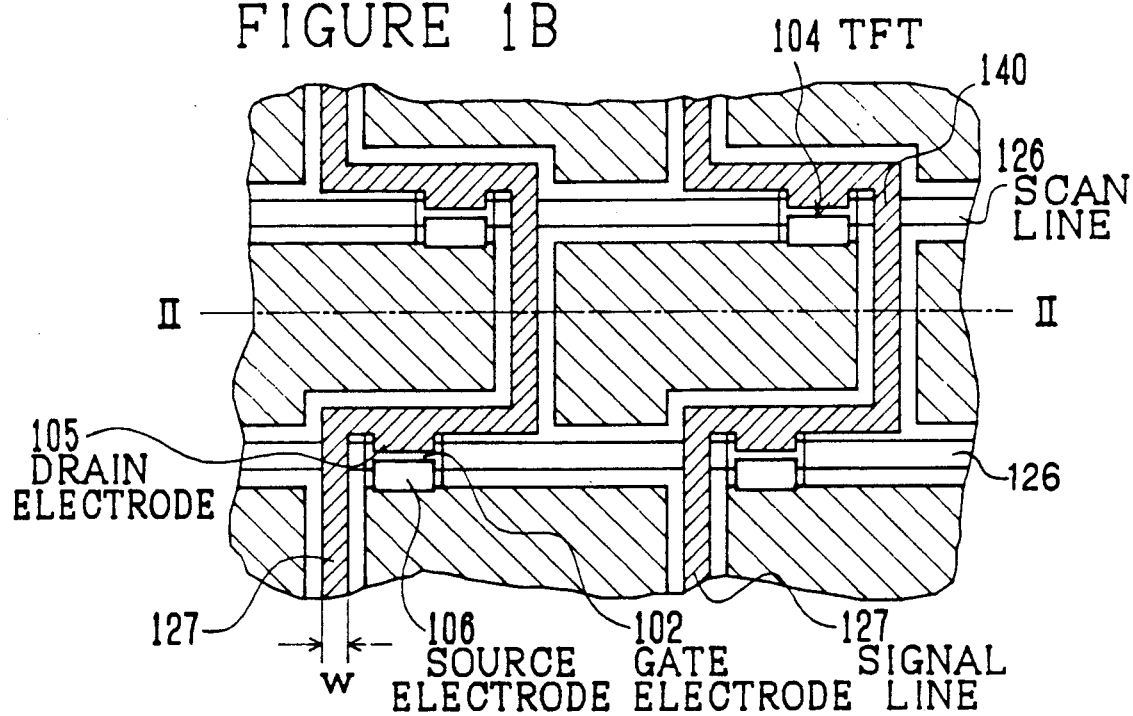

ACTIVE MATRIX LIQUID CRYSTAL DISPLAY HAVING A HIGH CONTRAST RATIO

BACKGROUND OF THE INVENTION

1. Field of the Invention

The present invention relates to an active matrix liquid crystal display using thin film transistors as drivers, and more specifically to an electrode structure of such a liquid crystal display for providing a high contrast ratio.

2. Description of Related Art

At present, active matrix liquid crystal displays are being rapidly used in wide and various fields because they enables a large scale of display and because they can drive a dot-matrix type color display with a low voltage.

Referring to FIG. 7, there is shown a diagrammatical sectional view of one typical conventional active matrix color liquid crystal display having thin film transistors (called "TFT" hereinafter) for selectively driving associated liquid crystal elements. The shown liquid crystal display has a substrate 701 having gate electrodes 702 connected to a scan line (not shown) and covered with an insulator layer 703. On each portion of the insulator layer 703 covering the the gate electrode 702, there is formed a TFT 704 having a drain electrode 705 and a source electrode 706, and on the other portion of the insulator layer 703, pixel electrodes 707 are provided one in association to each of the TFTs 704. Each of the pixel electrodes 707 is connected to the source electrode 706 of the associated TFT 704. Each of the drain electrodes is connected to a corresponding signal line (not shown) substantially diagonal to the gate electrodes 702.

A common counter electrode 724 is provided in opposite to the pixel electrodes 707 and separately from the pixel electrodes 707. In addition, a liquid crystal 725 such as twist-nematic liquid crystal is sandwiched between the pixel electrodes 707 and the common counter electrode 724, with an insulating layer being interposed between the pixel electrodes 707 and the liquid crystal 725 and another insulating layer being interposed between the common counter electrode 724 and the liquid crystal 725. Therefore, each of the pixel electrodes 707 defines one liquid crystal element. In correspondence to each liquid crystal element, one color filter such as a red filter 721, a green filter 722 or a blue filter 723 is located on the common counter electrode 724 so that the color filters form a mosaic pattern, and a color filter substrate 720 is provided to cover all the color filters 721, 722 and 723.

With the above mentioned arrangement, a voltage is selectively applied to the drain electrode through the signal line and the gate electrode through the scan line so as to turn on a TFT selected by an activated signal line and an activated scan line. As a result, a voltage is applied between the pixel electrode 707 and the counter electrode 724 of the liquid crystal element connected to the turned-on TFT, so that a light transparency condition of the liquid crystal between the pixel electrode 707 and the counter electrode 724 is changed under influence of the applied electric field, for example from an opaque condition to a transparent condition.

However, the actual liquid crystal display has 240 or 480 gate electrodes 702, which are sequentially scanned to be selectively applied with a voltage. Namely, each of the gate electrodes 702 is applied with no voltage for a time other than a selected time of period for driving. On the other hand, in most cases, each of the signal lines connected to the drain electrodes 705 is ceaselessly applied with a voltage unless the whole of one vertical line corresponding to the signal line should be black. If no voltage is applied to the gate electrode 702 of each TFT 704, the TFT will not be turned on, and therefore, no voltage is applied between the pixel electrode 707 and the counter electrode 724, but in most case a voltage is ceaselessly applied between the drain electrode 705 and the counter electrode 724.

As a result, an area in proximity of the drain electrode 705 and the signal line for supplying a video signal to the drain electrode 705 is ceaselessly applied with an electric field, as indicated by arrows in FIG. 7, and therefore, a portion of the liquid crystal element adjacent to the electric field applied area will consequently allow transparency of an error light as illustrated by Reference Numeral 750 in FIG. 7, other than the liquid crystal elements on the pixel electrodes selectively driven. Thus, the contrast ratio of each color and the purity of color are deteriorated, and chromaticity is decreased. As a result, an indication having a high saturation cannot be obtained.

Further, the signal line and the counter electrode are ceaselessly maintained in an electrostatically coupled condition. Therefore, an input voltage to the signal line is not sufficiently transmitted to the respective pixels. In order to resolve this problem, it is necessary to increase the drive voltage. This is contrary to the currently dominant demand for a low voltage driving.

Turning to FIG. 8, there is shown another sectional view of the conventional liquid crystal display taken along a line in parallel to a scan line (not shown) connected to the gate electrode (not shown). In FIG. 8, elements similar to those shown in FIG. 7 are given the same Reference Numerals. As shown by arrows in FIG. 8, an electric field is acted between an signal line 805 (connected to the drain electrode not shown in FIG. 8) and the counter electrode 724, so that an error transparent light 850 remarkably appears above and at opposite sides of the signal line 805 other than the TFT area. This will deteriorate the contrast not only in color liquid crystal displays but also in monochrome liquid crystal displays.

In order to resolve this problem in the case of color liquid crystal displays, there has been proposed to overlap all the color filters (red filter, green filter and blue filter) at a boundary area of adjacent pixels, as shown in FIG. 9. The overlapped portion of the three color filters will form a black matrix which defines the periphery of each pixel. But, this is not sufficient to shield the error transparent light. In addition, this has caused another problem in which the overlapped portion of the color filters will form a projection toward the substrate 701 with the result that the counter electrode 724 and the signal line (not shown) and the drain electrode 705 are strongly electrostatically coupled at the projected portion of the color filters as diagrammatically shown by Reference Numeral 960. This will make the low voltage drive more difficult.

SUMMARY OF THE INVENTION

Accordingly, it is an object of the present invention to provide an active matrix liquid crystal display which has overcome the above mentioned defect of the conventional one.

Another object of the present invention is to provide an active matrix liquid crystal display having a high contrast, a high purity of color and a high chromaticity so as to enable an image display having a high saturation.

Still another object of the present invention is to provide an active matrix liquid crystal display which can be driven with a low voltage.

The above and other objects of the present invention are achieved in accordance with the present invention by an active matrix liquid crystal display which includes a number of scan lines, a number of signal lines intersecting the scan lines to cooperate with the scan lines so as to form a matrix, a number of driving thin film transistors arranged in the form of a matrix and positioned one for each of intersecting points between the scan lines and the signal lines, each of the driving thin film transistors being connected to one scan line and one signal line, and a number of liquid crystal display elements connected one to each of the driving thin film transistors so that the liquid crystal display elements are selectively driven by the associated thin film transistors, each of the liquid crystal display elements having a display electrode, a counter electrode opposing the display electrode and a liquid crystal between the display electrode and the counter electrode, wherein the improvement is that the counter electrode has a slit at a region which is opposite to the signal line but which excludes an area where the signal lines and the scan lines are intersected.

In a preferred embodiment, a width W of the slit is selected to fulfil the following relation:

$$W \geq w + 2d$$

where
w is a width of the signal line
d is a thickness of the liquid crystal.

With the above mentioned arrangement, since the counter electrode has the slit at a portion in opposite to the signal line, the electrostatic coupling between the signal line and the counter electrode is greatly restrained. Particularly, if the slit is provided to have a sufficient width, the electrostatic coupling can be substantially confined to only the coupling between the pixel electrode and the counter electrode. As a result, the error transparent light is greatly suppressed, and the liquid crystal display can be driven with a low voltage.

The above and other objects, features and advantages of the present invention will be apparent from the following description of preferred embodiments of the invention with reference to the accompanying drawings.

BRIEF DESCRIPTION OF THE DRAWINGS

FIG. 1A is a partial plan view of a color filter array substrate having one embodiment of a counter electrode which is constructed in accordance with the present invention and which can be used in a liquid crystal display;

FIG. 1B is a partial plan view of a TFT array substrate used in combination with the color filter array substrate shown in FIG. 1A for constituting the liquid crystal display;

DESCRIPTION OF THE PREFERRED EMBODIMENTS

Figure 2:
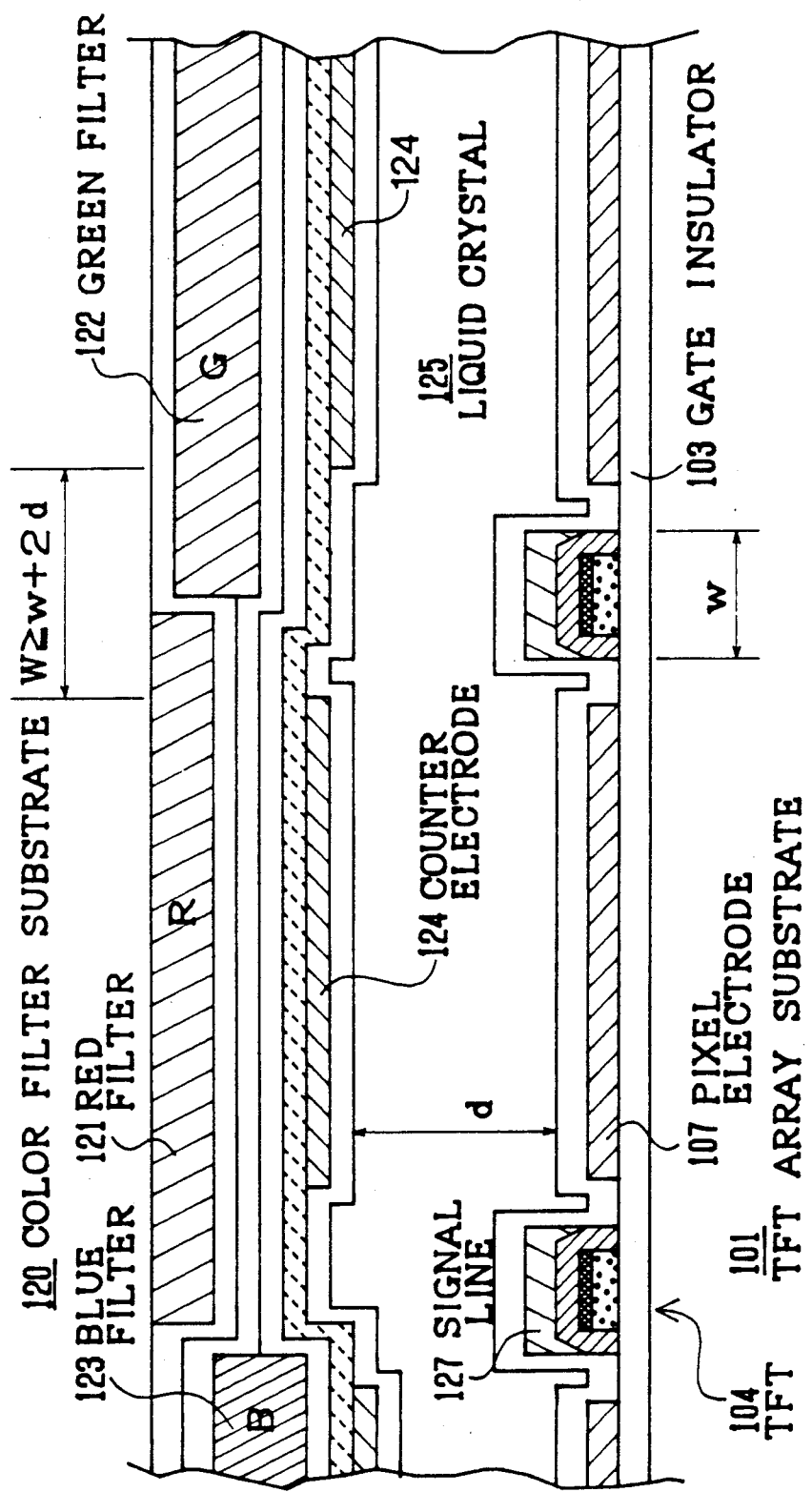
FIG. 2 is a sectional view of the liquid crystal display which is formed by combining the color filter array substrate shown in FIG. 1A and the TFT array substrate shown in FIG. 1B and which is taken along the line II—II in FIG. 1B.

Referring to FIG. 1A, there is shown a partial plan view of a color filter array substrate having one embodiment of a counter electrode which is constructed in accordance with the present invention and which can be used in a liquid crystal display. Also referring to FIG. 1B, there is shown a partial plan view of a TFT array substrate used in combination with the color filter array substrate shown in FIG. 1A for constituting the liquid crystal display. In addition, FIG. 2 shows a sectional view of the liquid crystal display taken along the line II—II in FIG. 1B, which display is formed by combining the color filter array substrate shown in FIG. 1A and the TFT array substrate shown in FIG. 1B. Namely, the liquid crystal display can be formed by sandwiching a liquid crystal between the color filter array substrate shown in FIG. 1A and the TFT array substrate shown in FIG. 1B.

The shown liquid crystal display has a substrate 101 having gate electrodes 102 connected to a scan line 126 and covered with an insulator layer 103. On each portion of the insulator layer 103 covering the the gate electrode 102, there is formed a TFT 104 having a drain electrode 105 and a source electrode 106, and on the other portion of the insulator layer 103, transparent pixel electrodes 107 are provided one in association to each of the TFTs 104 and connected to the source electrode 106 of the associated TFT 104. Each of the drain electrodes is continuous to a corresponding signal line 127 which extends to intersect the scan line 126.

A transparent common counter electrode 124 is provided in opposite to the pixel electrodes 107 and separately from the pixel electrodes 107. In addition, a liquid crystal 125 is sandwiched between the pixel electrodes 107 and the common counter electrode 124, with an insulating layer 103 being interposed between the pixel electrodes 107 and the liquid crystal 125 and another insulating layer being interposed between the common counter electrode 124 and the liquid crystal 125. Therefore, each of the pixel electrodes 107 defines one liquid crystal element. In correspondence to each liquid crystal element, one color filter such as a red filter 121, a green filter 122 or a blue filter 123 is located on the common counter electrode 124 so that the color filters form a mosaic pattern, and a color filter substrate 120 is provided to cover all the color filters 121, 122 and 123.

Figure 7:
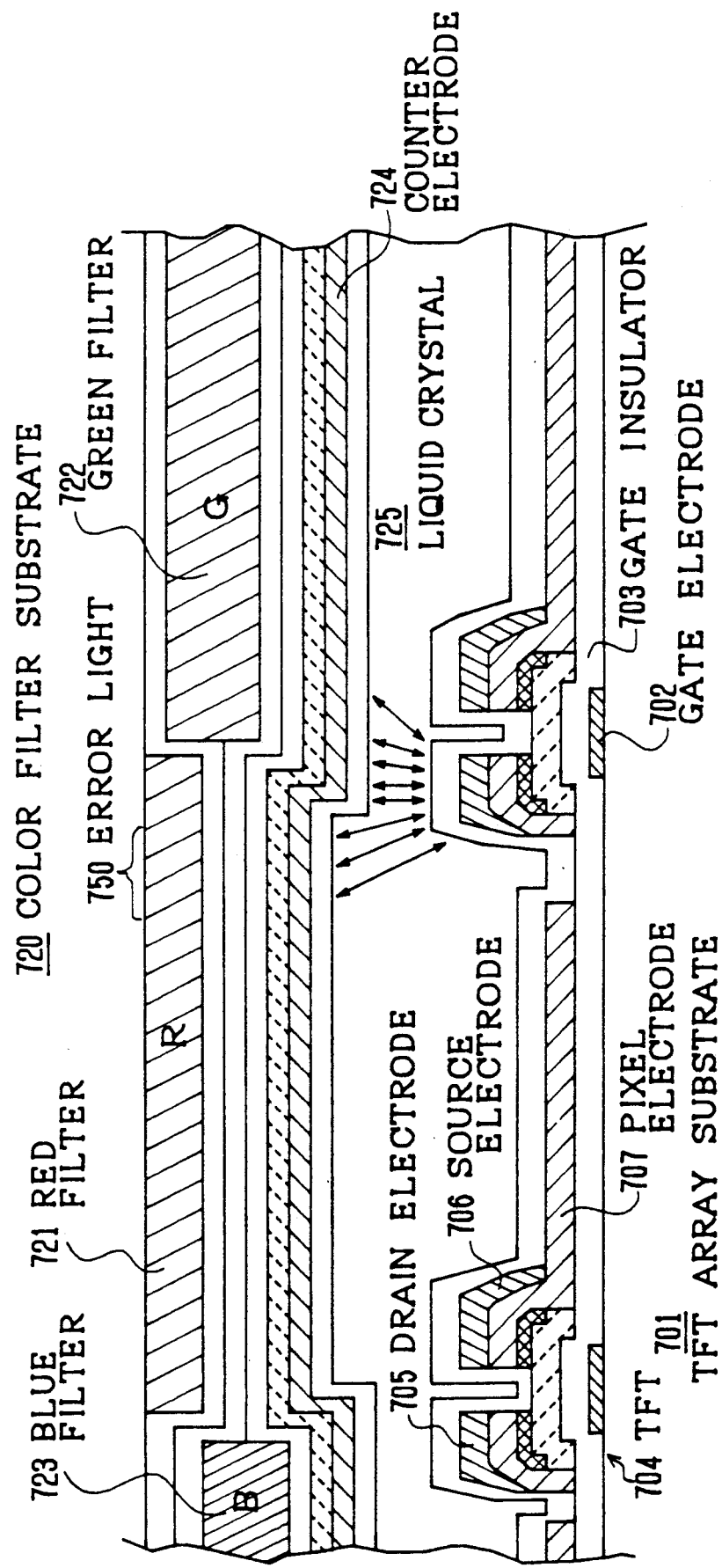
FIG. 7 is a sectional view of one typical conventional active matrix color liquid crystal display.
Figure 8:
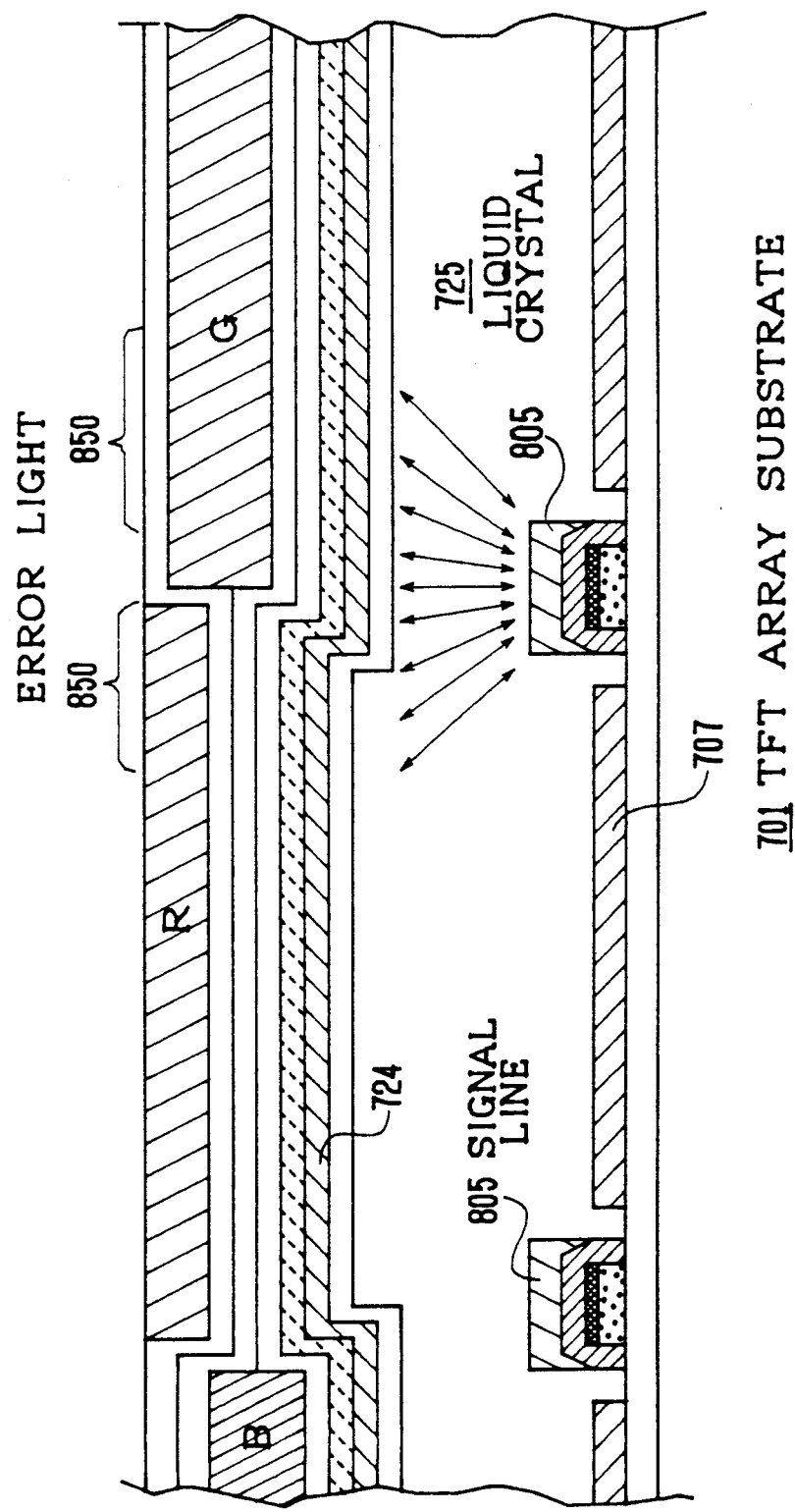
FIG. 8 is a sectional view of the conventional liquid crystal display taken along a line in parallel to a scan line.

The above mentioned construction is substantially the same as the conventional one as shown in FIG. 7. Therefore, each TFT 104 is positioned in proximity of an intersecting portion 140 between the scan line 126 continuous to the gate electrode 104 and the signal line 127 continuous to the drain electrode 105, similarly to the conventional liquid crystal display. However, as seen from FIG. 1A, the counter electrode 124 has a number of slits 130 in accordance with the present invention. The slit 130 is provided in registration with the signal line 127. On the other hand, no slit is formed in a portion 142 of the counter electrode 124 corresponding to the intersecting portion 140 between the scan line 126 and the signal line 127 so that the portion 142 maintains the counter electrode 124 in an integral form as a whole.

Thus, as seen from FIG. 2, an electric field is not acted between the counter electrode 124 and the signal line 127. On the other hand, an electric field is acted between the signal line 127 and the portion 142 of the counter electrode 124 corresponding to the intersecting portion 140 between the scan line 126 and the signal line 127, and therefore, an error transparent light would occur at opposite sides of the signal line 127 in an area of the portion 142. However, since the scan electrode 126 (as well as the signal electrode 127) is opaque, a light through the TFT array substrate 101 will be shielded by the scan line 126, so that the error transparent light is not leaked to the outside. In addition, even if the error transparent light is leaked, it is very fine and therefore quite inconspicuous. Further, the coupling between the signal line 127 and the counter electrode 124 is very small and is reduced to 1/10 to 1/30 of the conventional liquid crystal display.

As shown FIG. 2, the width "W" of the slit 130 is preferred to fulfil the following relation:

$$W \geq w + 2d$$

where
w is a width of the signal line
d is a maximum thickness of the liquid crystal.

The thickness of the liquid crystal is ordinarily at constant. But, in some case as mentioned above, the R, G, B color filters are partially overlapped to improve the black level, with the result that the thickness of the liquid crystal is made thinner in the overlapped portion of the color filters than the non-overlapped portion. In such a case, the distance between the pixel electrode 107 and the counter electrode 124 on the red filter 121 will represent the maximum thickness "d" of the liquid crystal.

By making the width "W" of the slit 130 than the width "w" of the signal line 127 by "2d", it is possible to extremely decrease the electrostatic coupling between the signal line 127 and the counter electrode 124. Therefore, both the generation of error transparent light and the drop of driving voltage can be dissolved.

Figure 3A:
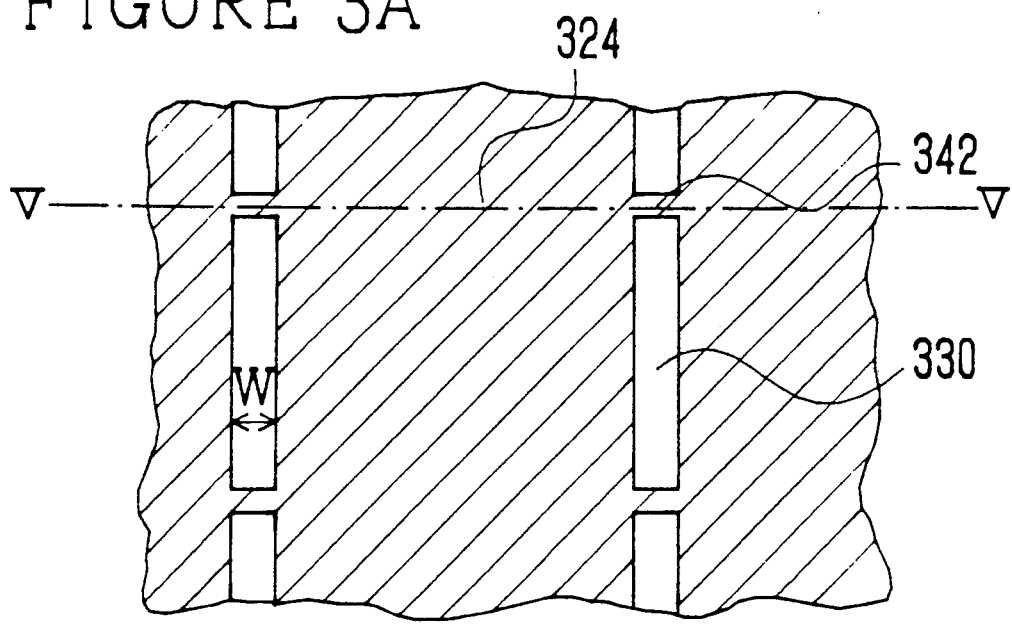
FIG. 3A is a view similar to FIG. 1A but showing another embodiment of the counter electrode constructed in accordance with the present invention.

Turning to FIG. 3A, there is shown a partial plan view of a color filter array substrate having another embodiment of a counter electrode which is constructed in accordance with the present invention and which can be used in a liquid crystal display. Also referring to FIG. 3B, there is shown a partial plan view of a TFT array substrate used in combination with the color filter array substrate shown in FIG. 3A for constituting the liquid crystal display. By sandwiching a liquid crystal between the color filter array substrate shown in FIG. 3A and the TFT array substrate shown in FIG. 3B, there is formed a liquid crystal display having a sectional structure shown in FIGS. 4 and 5. In FIGS. 3A, 3B, 4 and 5, elements similar or corresponding to those shown in FIGS. 1A, 1B and 2 are given Reference Numerals obtained by adding "200" to the Reference Numerals given to the respective elements shown in FIGS. 1A, 1B and 2. Therefore, explanation will be made on only portions different from the first embodiment.

As seen from comparison between the first embodiment and the second embodiment, the signal lines 327 are straight and therefore the slits 330 formed in the counter electrode 324 are also straight.

In this embodiment, the width "W" of the slit 330 is preferred to fulfil the following relation:

$$W \geq w + 2d$$

where
w is a width of the signal line
d is a maximum thickness of the liquid crystal.
Namely, as seen from FIG. 4 which shows a sectional view taken along the line IV—IV in FIG. 3B, the width "W" of the slit 330 is clearly larger than the width "w" of the signal line 327 which is the same as the drain electrode 305. More preferably, a center of the width of the slit 330 is consistent with a center of the width of the signal line 327.

Figure 3B:
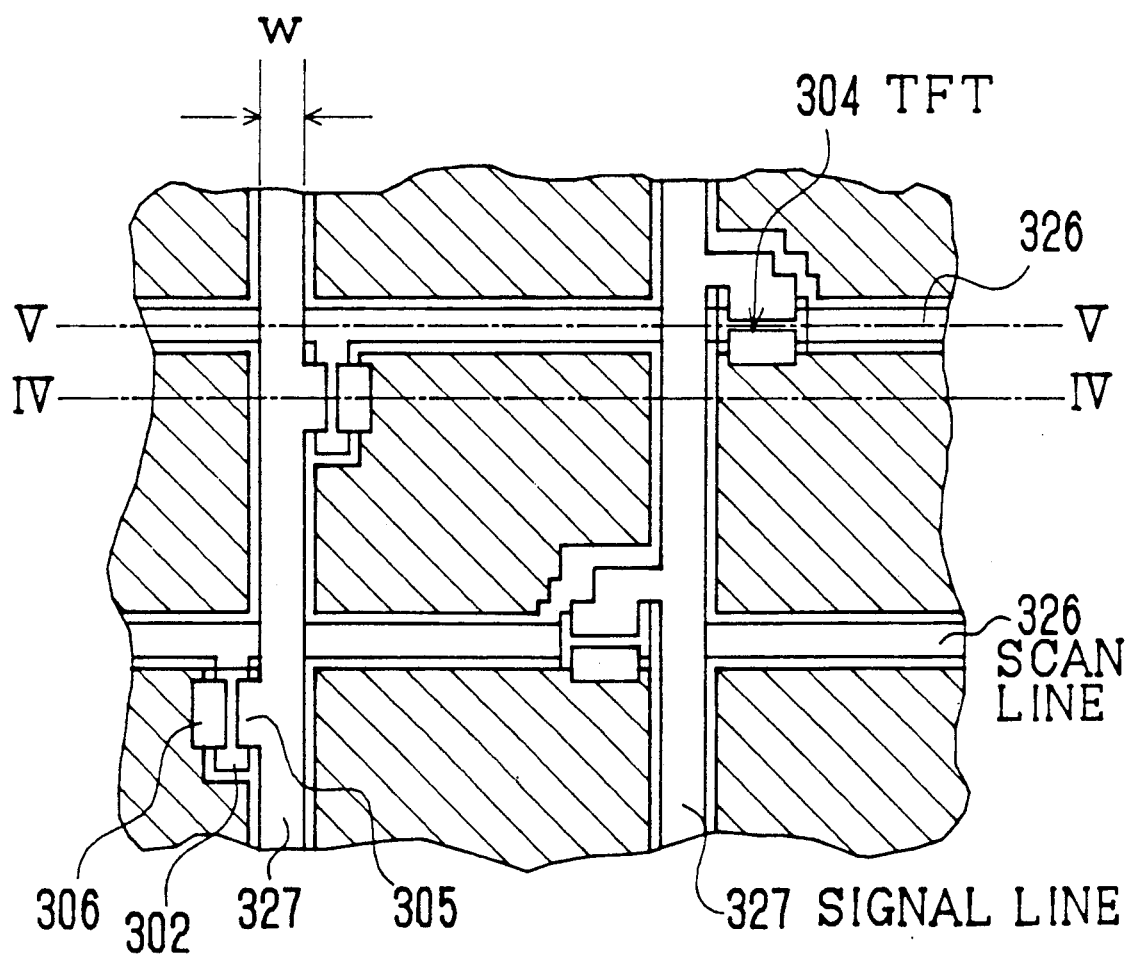
FIG. 3B is a view similar to FIG. 1B but showing another embodiment of the TFT array substrate used in combination with the color filter array substrate shown in FIG. 3A.
Figure 5:
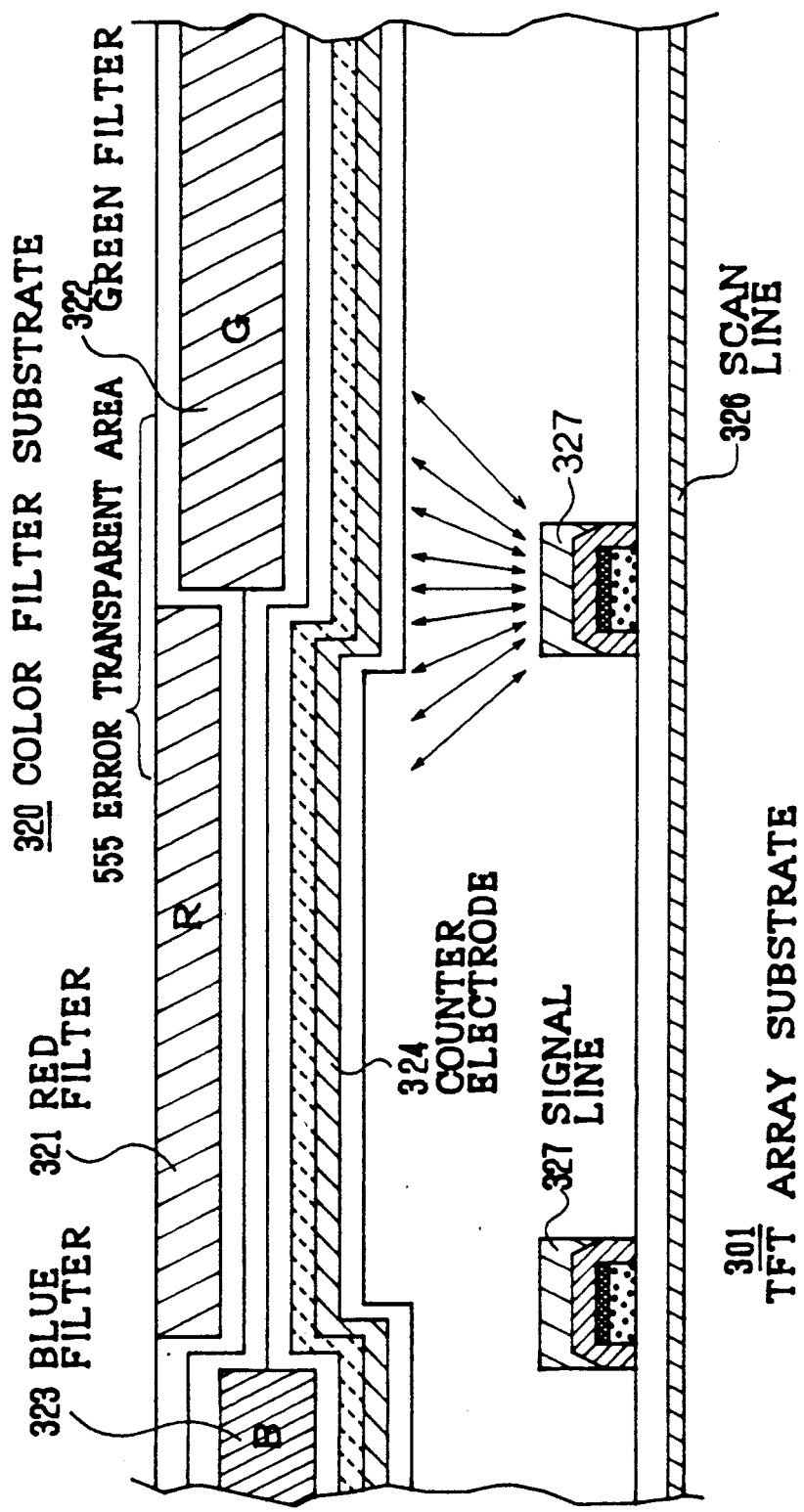
FIG. 5 is a sectional view similar to FIG. 5 but taken along the line V—V in FIG. 3B.

Turning to FIG. 5 which shows a sectional view taken along the line V—V in FIGS. 3A and 3B passing along and through the scan line 327, there can be known a condition of an intersection between the scan line 326 (continuous to the gate electrode 302) and the signal line 327 (continuous to the drain electrode 305). In this portion, the scan line 326 extends throughout. Therefore, even if an error transparent area 555 occurs because of an electric field between the signal line 327 and the counter electrode 324, an error light is shielded by the scan line 326, and therefore, quite inconspicuous. In addition, even if the error transparent light is leaked, since the coupling between the signal line and the counter electrode is very small, an advantage similar to that of the first embodiment can be obtained.

Figure 4:
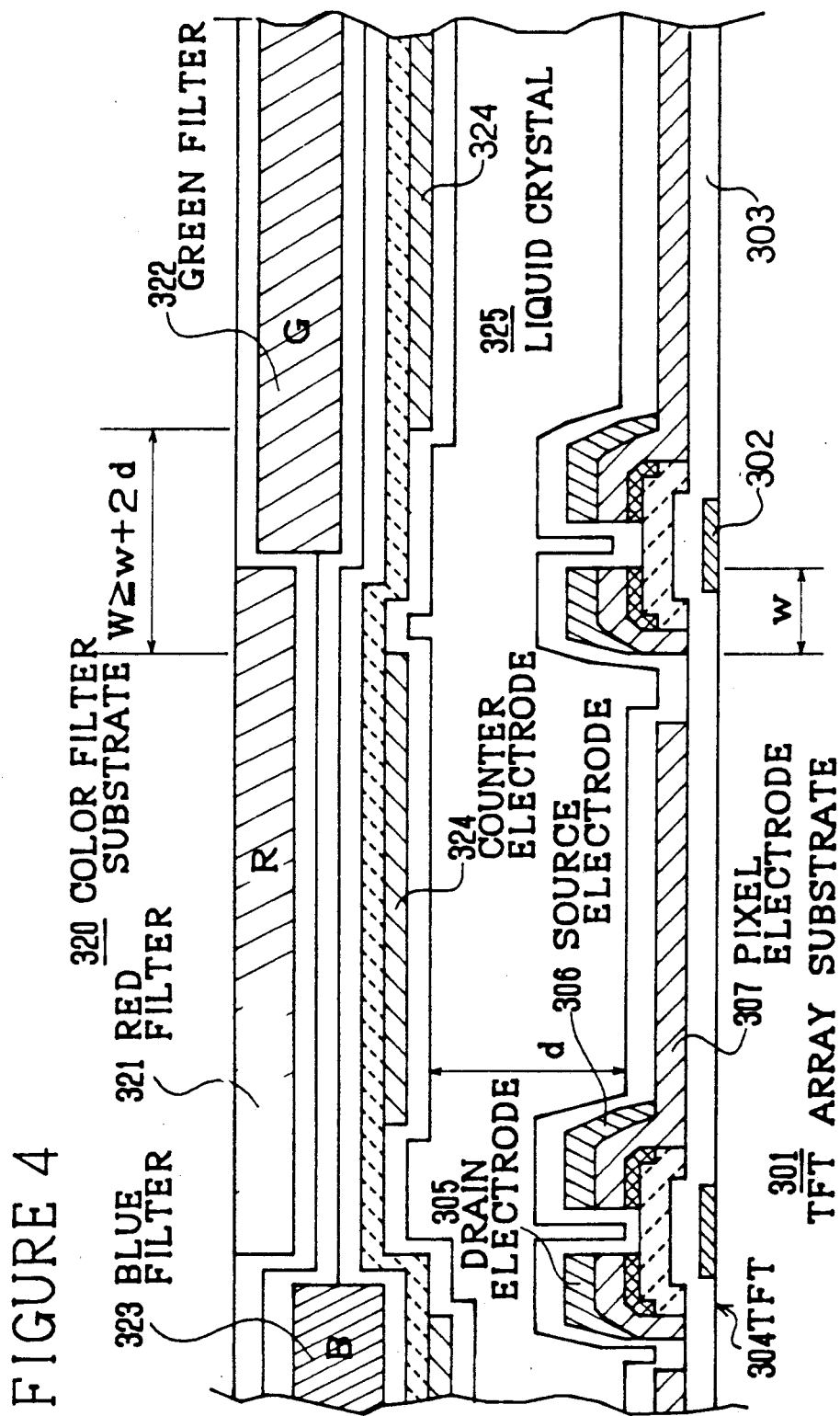
FIG. 4 is a sectional view of the liquid crystal display which is formed by combining the color filter array substrate shown in FIG. 3A and the TFT array substrate shown in FIG. 3B and which is taken along the line IV—IV in FIG. 3B.
Figure 6:
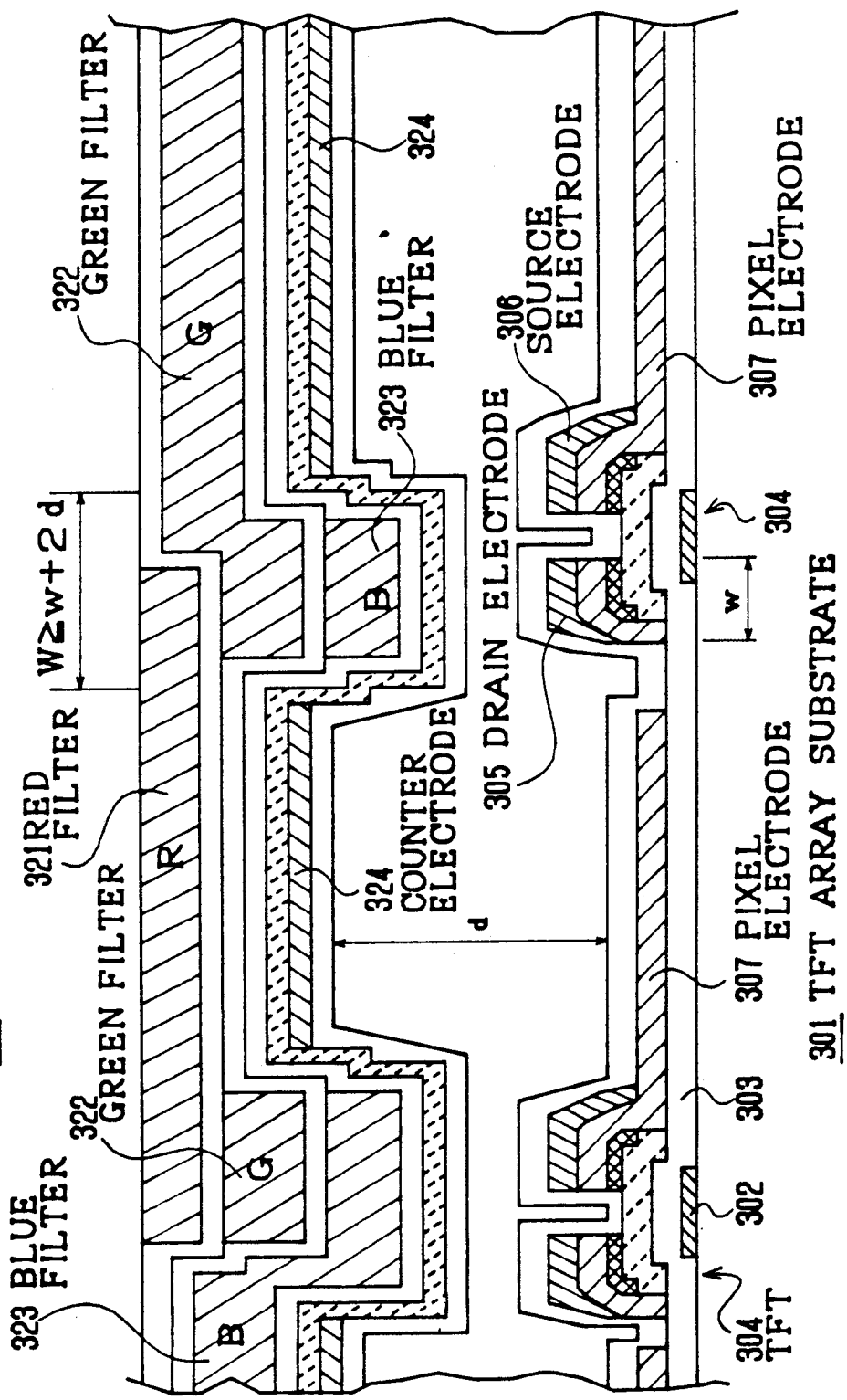
FIG. 6 is a view similar to FIG. 4 but showing a third embodiment of the liquid crystal display in accordance with the present invention.
Figure 9:
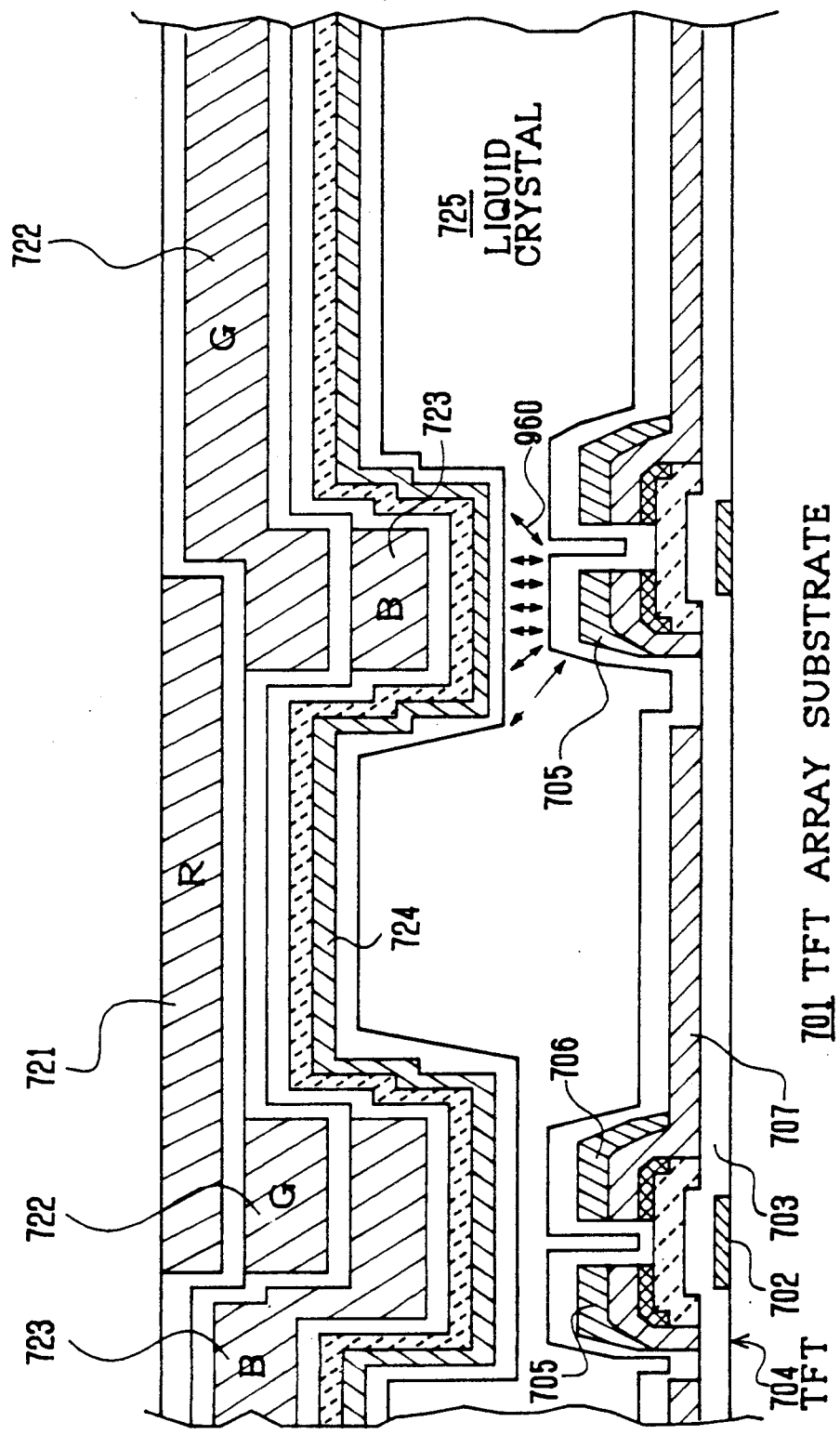
FIG. 9 is a sectional view of another conventional active matrix color liquid crystal display.

Referring to FIG. 6, there is shown a third embodiment in which the present invention is applied to the black matrix display as shown in FIG. 9. FIG. 6 is a sectional view similar to FIG. 4, and therefore, elements similar or corresponding to those shown in FIG. 4 are given the same Reference Numerals and explanation thereof will be omitted.

As seen from FIG. 6, the counter electrode 324 are removed from the overlapped portions of the color filters which form a projection on the color filter substrate 320. Namely, the slits 330 are formed in registration to the overlapped portions of the color filters. Therefore, since no counter electrode is on the overlapped portions of the color filters, it is possible to greatly decrease the electrostatic coupling between the counter electrode and the signal line continuous to the drain line.

As mentioned above, the liquid crystal display in accordance with the present invention has succeeded in decreasing the area of the overlapping portions between the counter electrode and the signal line so that the counter electrode and the signal line is overlapped above only the scan line. As a result, the error light can be avoided, and it is possible to prevent the elevation of the driving voltage which had been required to cope with the electrostatic coupling. Accordingly, the contrast and chronicity can be improved so that an image display having a high saturation can be obtained. In addition, a low driving voltage and a low power consumption can be realized.

The invention has thus been shown and described with reference to the specific embodiments. However, it should be noted that the present invention is in no way limited to the details of the illustrated structures but changes and modifications may be made within the scope of the appended claims.

I claim:

1. An active matrix liquid crystal display which includes a number of scan lines, a number of signal lines intersecting the scan lines to cooperate with the scan lines so as to form a matrix, a number of driving thin film transistors arranged in the form of a matrix and positioned one for each of intersecting points between the scan lines and the signal lines, each of the driving thin film transistors being connected to one scan line and one signal line, and a number of liquid crystal display elements connected one to each of the driving thin film transistors so that the liquid crystal display elements are selectively driven by the associated thin film transistors, each of the liquid crystal display elements having a display electrode, a counter electrode opposing the display electrode and a liquid crystal between the display electrode and the counter electrode, the counter electrode being common to the display electrodes of all the liquid crystal display elements wherein the improvement is that the counter electrode has a slit only at a region which is opposite to the signal line and extends along the signal line but which excludes a selected area for connection of counter electrode portions on both sides of said slit, the selected area being located above only the scan lines; and wherein a width W of said slit fulfils the following relation:

$$W \geq w + 2d$$

where
w is a width of the signal line
d is a maximum thickness of the liquid crystal.

2. An active matrix liquid crystal display which includes a number of scan lines, a number of signal lines intersecting the scan lines to cooperate with the scan lines so as to form a matrix, a number of driving thin film transistors arranged in the form of a matrix and positioned one for each of intersecting points between the scan lines and the signal lines, each of the driving thin film transistors being connected to one scan line and one signal line, and a number of liquid crystal display elements connected one to each of the driving thin film transistors so that the liquid crystal display elements are selectively driven by the associated thin film transistors, each of the liquid crystal display elements having a display electrode, a counter electrode opposing the display electrode and a liquid crystal between the display electrode and the counter electrode, the counter electrode being common to the display electrodes of all the liquid crystal display elements wherein the improvement is that the counter electrode has a slit only at a region which is opposite to the signal line and extends along the signal line but which excludes a selected area for connection of counter electrode portions on both sides of said slit, the selected are being located above only the scan lines;

wherein said selected area is an area where the signal lines and the scan lines are intersected;

wherein a width W of said slit fulfils the following relation:

$$W \geq w + 2d$$

where
w is a width of the signal line
d is a maximum thickness of the liquid crystal.

* * * * *